United States Patent
Burckhardt et al.

(10) Patent No.: US 10,487,237 B2
(45) Date of Patent: *Nov. 26, 2019

(54) LIQUID-APPLIED WATERPROOFING MEMBRANE FOR ROOFS COMPRISING A LONG-CHAIN ALDIMINE

(71) Applicant: SIKA TECHNOLOGY AG, Baar (CH)

(72) Inventors: Urs Burckhardt, Zurich (CH); Ursula Stadelmann, Zurich (CH); Hans Haberle, Gailingen (DE); Michael Byrne, Lytham (GB); Mark Gatrell, Chipping Preston (GB); Alexander Coward, Sale (GB)

(73) Assignee: SIKA TECHNOLOGY AG, Baar (CH)

( * ) Notice: Subject to any disclaimer, the term of this patent is extended or adjusted under 35 U.S.C. 154(b) by 926 days.

This patent is subject to a terminal disclaimer.

(21) Appl. No.: 14/762,349

(22) PCT Filed: Jan. 21, 2014

(86) PCT No.: PCT/EP2014/051140
§ 371 (c)(1),
(2) Date: Jul. 21, 2015

(87) PCT Pub. No.: WO2014/114643
PCT Pub. Date: Jul. 31, 2014

(65) Prior Publication Data
US 2015/0353770 A1 Dec. 10, 2015

(30) Foreign Application Priority Data

Jan. 22, 2013 (EP) .................................... 13152262
Jan. 22, 2013 (EP) .................................... 13152264
Jan. 22, 2013 (EP) .................................... 13152265

(51) Int. Cl.
| | | |
|---|---|---|
| C09D 175/08 | (2006.01) |
| E04D 7/00 | (2006.01) |
| C08G 18/75 | (2006.01) |
| C08G 18/79 | (2006.01) |
| C08G 18/12 | (2006.01) |
| C09D 175/12 | (2006.01) |
| C08G 18/30 | (2006.01) |
| C08G 18/32 | (2006.01) |

(52) U.S. Cl.
CPC ........... *C09D 175/08* (2013.01); *C08G 18/12* (2013.01); *C08G 18/307* (2013.01); *C08G 18/3256* (2013.01); *C08G 18/755* (2013.01); *C08G 18/792* (2013.01); *C09D 175/12* (2013.01); *E04D 7/00* (2013.01); *Y10T 428/31551* (2015.04); *Y10T 442/10* (2015.04)

(58) Field of Classification Search
CPC .. C08G 18/12; C08G 18/307; C08G 18/3256; C08G 18/755; C08G 18/792; C08G 2190/00; C09D 175/08; C09D 175/12; E04D 7/00; Y10T 428/31551; Y10T 442/10

See application file for complete search history.

(56) References Cited

U.S. PATENT DOCUMENTS

| | | | | |
|---|---|---|---|---|
| 4,584,233 A | * | 4/1986 | Meader, Jr. ............. | B29C 73/10 442/151 |
| 5,084,487 A | * | 1/1992 | Becker ................. | C08G 18/503 252/182.23 |
| 5,087,661 A | | 2/1992 | Aoki et al. | |
| 5,466,769 A | | 11/1995 | Chou | |
| 5,506,329 A | | 4/1996 | Chou | |
| 5,571,922 A | | 11/1996 | Chou | |
| 5,591,819 A | | 1/1997 | Chou | |
| 9,752,054 B2 | * | 9/2017 | Byrne ................. | C08G 18/755 |
| 9,879,154 B2 | * | 1/2018 | Byrne ................. | C09D 175/04 |
| 2005/0065276 A1 | | 3/2005 | Burckhardt et al. | |
| 2006/0122352 A1 | | 6/2006 | Burckhardt | |
| 2007/0276058 A1 | | 11/2007 | Burckhardt et al. | |
| 2008/0114146 A1 | | 5/2008 | Burckhardt | |
| 2008/0280145 A1 | * | 11/2008 | Paschkowski ...... | B29C 66/1122 428/412 |

(Continued)

FOREIGN PATENT DOCUMENTS

| | | |
|---|---|---|
| CN | 1608089 A | 4/2005 |
| CN | 101309898 A | 11/2008 |

(Continued)

OTHER PUBLICATIONS

Jan. 9, 2018 Office Action issued in Japanese Patent Application No. 2015-553126.
Office Action (Notification of the First Office Action (PCT Application in the National Phase)) dated Mar. 30, 2017, by the State Intellectual Property Office of the People's Republic of China in corresponding Chinese Patent Application No. 201480004121.1, and an English Translation of the Office Action. ( 20 pages).
Sep. 19, 2017 Office Action issued in Chinese Patent Application No. 201480004121.1.
International Search Report (PCT/ISA/210) dated Apr. 15, 2014, by the European Patent Office as the International Searching Authority for International Application No. PCT/EP2014/051140.
Written Opinion (PCT/ISA/237) dated Apr. 15, 2014, by the European Patent Office as the International Searching Authority for International Application No. PCT/EP2014/051140.
Thomson Scientific, London, GB; AN 2010-D86281 X002721224.
International Search Report (PCT/ISA/210) dated Mar. 6, 2014, by the European Patent Office as the International Searching Authority for International Application No. PCT/EP2014/051138.

(Continued)

*Primary Examiner* — Jennifer A Steele
(74) *Attorney, Agent, or Firm* — Oliff PLC

(57) ABSTRACT

The present invention describes a one-part moisture-curing liquid-applied waterproofing membrane having a polyurethane polymer, a long-chain aldimine and a hardener selected from an oxazolidine and another aldimine. The membrane has a low viscosity at low solvent content and a good shelf life stability and cures fast to form a solid elastic material. The membrane is particularly suitable for roofing applications, possessing high strength, high elongation and good durability under outdoor weathering conditions in a broad temperature range.

18 Claims, No Drawings

(56) References Cited

U.S. PATENT DOCUMENTS

| | | | |
|---|---|---|---|
| 2009/0099333 A1* | 4/2009 | Burckhardt | C07C 251/08 528/310 |
| 2009/0202837 A1* | 8/2009 | Onuoha | C08G 18/12 428/413 |
| 2010/0009076 A1 | 1/2010 | Walther et al. | |
| 2010/0101455 A1* | 4/2010 | Burckhardt | C07C 251/08 106/287.3 |
| 2011/0198031 A1 | 8/2011 | Burckhardt | |
| 2012/0045652 A1 | 2/2012 | Zahn et al. | |
| 2012/0220736 A1 | 8/2012 | Burckhardt | |

FOREIGN PATENT DOCUMENTS

| | | |
|---|---|---|
| CN | 101484491 A | 7/2009 |
| CN | 102421817 A | 4/2012 |
| EP | 2 017 260 A1 | 1/2009 |
| EP | 2 236 534 A1 | 10/2010 |
| JP | 9-286836 A | 11/1997 |
| JP | 2007-332257 A | 12/2007 |
| JP | 2009-530431 A | 8/2009 |
| JP | 2010-533677 A | 10/2010 |
| JP | 2012-506936 A | 3/2012 |
| KR | 10-0949599 B1 | 3/2010 |
| WO | WO 95/11933 A1 | 5/1995 |
| WO | WO 2004/013200 A1 | 2/2004 |
| WO | WO 2008/000831 A1 | 1/2008 |
| WO | WO 2009/010522 A1 | 1/2009 |
| WO | WO 2013/182234 A1 | 12/2013 |
| WO | WO 2014/114639 A1 | 7/2014 |
| WO | WO 2014/114642 A1 | 7/2014 |

OTHER PUBLICATIONS

Written Opinion (PCT/ISA/237) dated Mar. 6, 2014, by the European Patent Office as the International Searching Authority for International Application No. PCT/EP2014/051138.

International Search Report (PCT/ISA/210) dated Mar. 6, 2014, by the European Patent Office as the International Searching Authority for International Application No. PCT/EP2014/051137.

Written Opinion (PCT/ISA/237) dated Mar. 6, 2014, by the European Patent Office as the International Searching Authority for International Application No. PCT/EP2014/051137.

International Search Report (PCT/ISA/210) dated Feb. 25, 2014, by the European Patent Office as the International Searching Authority for International Application No. PCT/EP2014/051135.

Written Opinion (PCT/ISA/237) dated Feb. 25, 2014, by the European Patent Office as the International Searching Authority for International Application No. PCT/EP2014/051135.

International Search Report (PCT/ISA/210) dated Apr. 25, 2014, by the European Patent Office as the International Searching Authority for International Application No. PCT/EP2014/051134.

Written Opinion (PCT/ISA/237) dated Apr. 25, 2014, by the European Patent Office as the International Searching Authority for International Application No. PCT/EP2014/051134.

Thomson Scientific, London, GB; AN 2010-D86281 XP002697879.

Aug. 7, 2018 Office Action issued in Japanese Application No. 2015-553126.

Aug. 30, 2018 Office Action issued in Chinese Application No. 201480004121.1.

Mar. 5, 2019 Office Action issued in European Application No. 14 701 174.6.

* cited by examiner

LIQUID-APPLIED WATERPROOFING MEMBRANE FOR ROOFS COMPRISING A LONG-CHAIN ALDIMINE

FIELD OF THE INVENTION

The invention relates to a liquid-applied waterproofing membrane based on one-part moisture-curing polyurethane, in particular for roofing applications.

BACKGROUND OF THE INVENTION

Liquid-applied waterproofing membranes are known. In roofing applications they are used as an alternative to prefabricated sheet membranes, offering easier application especially in the case of complex roof geometries and for refurbishment tasks, providing a flexible seamless roof coating which is fully adhered to the substrate.

Liquid-applied waterproofing membranes on roofs have to fulfill demanding requirements. They need to have a low viscosity to be applied as self-levelling coatings and a sufficiently long open time to enable hand application, but still cure fast in order to quickly lose their vulnerability. When fully cured the roofing membrane needs to have durable elasticity and strength in order to protect the building effectively from water ingress in a broad temperature range and under outdoor weathering conditions, such as wind forces, ponding water, frost, strong sunlight irradiation, microbial attack and root penetration.

State-of-the-art liquid-applied waterproofing membranes are often reactive polyurethane compositions, formulated as one-part or as two-part systems, also called single-component or two-component systems, respectively. Two-part systems are more complex to apply, requiring special mixing equipment and proper metering of the two components, since mistakes in mixing quality and/or stoichiometry strongly affect the membrane performance. One-part systems are easy to apply, but prone to curing defects. State-of-the-art one-part systems comprise blocked amine hardeners, in particular oxazolidines, to prevent excessive gassing from carbon dioxide formation on curing. They generally contain considerable amounts of solvents to guarantee low viscosity and sufficient shelf life. Attempts spurred by tightening VOC regulation to reduce the solvent content of such one-part systems typically result in difficulties with shelf life stability and bad workability because of high viscosity, as the viscosity of the compositions starts on a higher level and increases further from premature crosslinking reactions between the NCO groups of the prepolymer and the oxazolidine hardeners during storage. Further drawbacks of conventional one-part membranes are related to slow curing and unpleasant odours caused by the emission of the blocking agent, a volatile aldehyde or ketone.

WO 2009/010522 and WO 2008/000831 disclose compositions containing polyaldimines as blocked amine hardeners, which are usable i.a. as one-component elastic coatings, preferably for flooring purposes.

U.S. Pat. No. 5,087,661 discloses compositions comprising polyaldimines, i.a. a long-chain polyether aldimine derived from a polyethertriamine and benzaldehyde, which are usable as water proof material, flooring material, sealing material, wall covering material and paint.

There is a strong need for high quality liquid-applied waterproofing membranes with low viscosity in order to be able to formulate products with very low or no solvent content.

SUMMARY OF THE INVENTION

The task of this invention is to provide a one-part liquid-applied waterproofing membrane useful for roofing applications having good shelf life stability and low viscosity at low solvent content, even when containing only about 50 g VOC per liter or less, as well as fast and reliable curing properties and high strength, elasticity and durability.

Surprisingly it was found that the liquid-applied waterproofing membrane according to Claim 1 fulfills this task and has additional benefits. It contains a long-chain polyether aldimine of the formula (I) combined with at least one other aldimine or oxazolidine. The membrane comprising this specific combination of hardeners surprisingly affords a very attractive set of properties not reached by state-of-the-art membranes: very low viscosity at low solvent content, good shelf life stability, fast and reliable curing properties, and high strength and flexibility. The long-chain polyether aldimine of the formula (I) thereby acts as a reactive diluent, lowering the viscosity of the membrane and thus allowing to minimize solvent content without compromising on application or performance properties. With the long-chain polyether aldimine alone the membrane develops less strength and durability, and with other aldimines or oxazolidines alone the viscosity of the membrane remains on a higher level. The possibility of combining low solvent content with good shelf life and good mechanical properties provides the formulator with the unique opportunity to obtain a high-end product fulfilling toughest VOC regulations, having minimal shrinkage and a low odour profile. The good mechanical properties afford high crack-bridging qualities in a broad temperature range and ensure high durability.

A further surprise is the fact that the inventive membranes have a high tolerance towards high humidity and/or direct water contact during application, which is a key benefit when working outdoor under harsh climatic conditions like fog, rainfall and in humid conditions where condensed water occurs, like dew or tropical dampness. Especially in the preferred embodiments as detailed below, the water tolerance is so good that water can be actively mixed into the membrane, thus providing further dilution and allowing easy application, without leading to curing defects.

The liquid-applied waterproofing membrane according to claim 1 is particularly suitable for use on a roof, particularly on a flat or low slope roof. It is particularly advantageous for detailing work and for refurbishment purposes.

Another aspect of the invention is a method to dilute a one-part moisture-curing liquid-applied waterproofing membrane with a long-chain aldimine of the formula (I).

Other aspects of the invention are revealed in other independent claims. Preferred aspects of the invention are revealed in the dependent claims.

DETAILED DESCRIPTION OF THE INVENTION

The subject of the present invention is a one-part moisture-curing liquid-applied waterproofing membrane comprising
at least one isocyanate-functional polyurethane polymer;
at least one aldimine of the formula (I),

(I)

wherein m is 2 or 3,

A is a divalent or a trivalent hydrocarbyl moiety of average molecular weight in the range of 800 to 4,000 g/mol containing ether groups, and Z is a monovalent $C_3$ to $C_{30}$ hydrocarbyl moiety optionally containing ether, carbonyl, ester, amido, urethane, urea or tertiary amino groups; and at least one hardener which is an oxazolidine or an aldimine different from formula (I).

In this document, the term "one-part moisture-curing" refers to a liquid-applied membrane, which is contained in a single moisture-tight container, has a certain shelf life stability and cures when exposed to moisture.

In this document the term "liquid-applied waterproofing membrane" refers to a material which is applied in liquid form as a layer onto a substrate, and which cures to form an elastic membrane making the substrate waterproof.

In this document, the term "polyurethane polymer" includes all polymers prepared by the so-called diisocyanate polyaddition process. It includes isocyanate-functional polyurethane polymers obtained by reacting polyisocyanates and polyols, which may also be called prepolymers and are polyisocyanates themselves.

In this document the term "molecular weight" refers to the molar mass (given in grams per mole) of a molecule or a part of a molecule, also referred to as "moiety". The term "average molecular weight" refers to the number-average molecular weight ($M_n$) of an oligomeric or polymeric mixture of molecules or moieties.

In this document, the term "shelf life stability" refers to the ability of a composition to be stored at room temperature in a suitable container under exclusion of moisture for a certain time interval, in particular several months, without under-going significant changes in application or end-use properties.

In this document, substance names starting with "poly", such as polyol, polyisocyanate or polyamine, refer to substances carrying two or more of the respective functional groups (e.g. OH groups in the case of polyol) per molecule.

In this document an amine or an isocyanate is called "aliphatic" when its amino group or its isocyanate group, respectively, is directly bound to an aliphatic, cycloaliphatic or arylaliphatic moiety. The corresponding functional group is therefore called an aliphatic amino or an aliphatic isocyanate group, respectively.

In this document an amine or an isocyanate is called "aromatic" when its amino group or its isocyanate group, respectively, is directly bound to an aromatic moiety. The corresponding functional group is therefore called an aromatic amino or an aromatic isocyanate group, respectively.

In this document, the term "primary amino group" refers to an $NH_2$-group bound to an organic moiety, and the term "secondary amino group" refers to a NH-group bound to two organic moieties which together may be part of a ring.

In this document the acronym "VOC" stands for "volatile organic compounds", which are organic substances having a vapour pressure of at least 0.01 kPa at a temperature of 293.14 K.

In this document, the term "solvent" refers to a liquid which is a VOC, which is able to dissolve isocyanate-functional polyurethane polymers as described in this document, and which does not carry any isocyanate-reactive functional groups.

In this document, "room temperature" refers to a temperature of 23° C. A dashed line in the chemical formulas of this document represents the bonding between a moiety and the corresponding rest of the molecule.

The liquid-applied membrane of this invention comprises at least one isocyanate-functional polyurethane polymer.

A suitable isocyanate-functional polyurethane polymer may be obtained from the reaction of at least one polyisocyanate with at least one polyol, whereby the isocyanate groups are in stoichiometric excess over the hydroxyl groups. The polyisocyanate and the polyol are brought to reaction via known methods, preferably at temperatures between 50 and 100° C., optionally by using a suitable catalyst. Preferably the polyisocyanate is used in an amount corresponding to an isocyanate to hydroxyl group ratio in the range of 1.3 to 5, more preferably 1.5 to 3. Preferably the polyurethane polymer has a free NCO group content in the range of 1 to 10 weight-%, preferably 2 to 8 weight-%. Optionally the polyol and the polyisocyanate may be reacted in the presence of a plasticizer or a solvent which are free from isocyanate-reactive groups.

Preferably the isocyanate-functional polyurethane polymer has an average molecular weight in the range of 1,000 to 10,000 g/mol, more preferably in the range of 1,000 to 5,000 g/mol.

Preferably the isocyanate-functional polyurethane polymer has an average isocyanate functionality in the range of 1.7 to 3, more preferably 1.8 to 2.5.

Suitable polyols for preparing the isocyanate-functional polyurethane polymer are polyether polyols, including those containing dispersed styrene-acrylonitrile (SAN), acrylonitrile-methylmethacrylate or urea particles, further polyester polyols such as products of the polycondensation reaction of diols or triols with lactones or dicarboxylic acids or their esters or anhydrides, further polycarbonate polyols, block copolymer polyols with at least two different blocks of polyether, polyester or polycarbonate units, polyacrylate and polymethacrylate polyols, polyhydroxy-functional fats and oils, especially natural fats and oils, and polyhydrocarbon polyols, such as polyhydroxy-functional polyolefins.

Along with the above-mentioned polyols, small amounts of low molecular weight divalent or multivalent alcohols can be used, such as 1,2-ethanediol, 1,2-propanediol, neopentyl glycol, dibromoneopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimer fatty alcohols, 1,1,1-trimethylolethane, 1,1,1-trimethylolpropane, glycerol, pentaerythritol, sugar alcohols, such as xylitol, sorbitol or mannitol, sugars, such as saccharose, other polyhydric alcohols, low molecular weight alkoxylation products of the above-mentioned divalent or multivalent alcohols, as well as mixtures of the above-mentioned alcohols.

Preferred polyols are diols and triols with an average molecular weight in the range of 500 to 6,000 g/mol, particularly in the range of 1,000 to 5,000 g/mol.

Preferred polyols are polyether polyols, polyester polyols, polycarbonate polyols and polyacrylate polyols.

Particularly preferred polyols are polyether polyols, particularly polyoxyalkylenepolyols. These polyols help to develop good low temperature flexibility in the cured membrane.

Polyoxyalkylenepolyols are products of the polymerization of ethylene oxide, 1,2-propylene oxide, 1,2- or 2,3-butylene oxide, oxetane, tetrahydrofuran or mixtures thereof, optionally polymerized using a starter molecule with two or more active hydrogen atoms, such as water, ammonia or compounds with several OH- or NH-groups, such as 1,2-ethanediol, 1,2- and 1,3-propanediol, neopentylglycol, diethyleneglycol, triethyleneglycol, the isomeric dipropyleneglycols and tripropyleneglycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds.

Preferred are both polyoxyalkylenepolyols with a low degree of unsaturation (measured according to ASTM D-2849-69 and indicated in milliequivalents of unsaturation per gram of polyol (meq/g)), obtainable, for example, by using so-called double metal cyanide complex catalysts (DMC catalysts), and polyoxyalkylenepolyols with a higher degree of unsaturation, obtainable, for example, by using anionic catalysts such as NaOH, KOH, CsOH or alkali alcoholates. Particularly preferred polyoxyalkylenepolyols are polymerization products of ethylene oxide and/or propylene oxide.

More preferred are polyoxypropylenepolyols and so-called ethylene oxide endcapped polyoxypropylenepolyols. The latter are specific polyoxypropylene-polyoxyethylenepolyols obtainable by post-ethoxylating pure polyoxypropylenepolyols, thus featuring primary hydroxyl groups. These polyols provide good low temperature flexibility and good weathering properties in the cured membrane.

Particularly preferred are polyoxypropylenediols and -triols and ethylene oxide endcapped polyoxypropylenediols and -triols with an average molecular weight in the range of 500 to 6,000 g/mol, particularly in the range of 1,000 to 5,000 g/mol.

These polyether polyols provide a combination of low viscosity, good weathering properties and good mechanical properties in the cured membrane.

Further particularly preferred polyols are polycarbonate polyols, particularly products of the polycondensation of dialkyl carbonates, diaryl carbonates or phosgene with diols or triols such as ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-octadecanediol, 1,4-cyclohexane dimethanol, dimeric fatty acid diol (dimeryl diol), hydroxypivalic neopentylglycol ester, glycerol and 1,1,1-trimethylolpropane.

Such polycarbonate polyols can help to develop good weathering properties of the membrane.

Preferred low molecular weight alcohols are difunctional alcohols with a molecular weight in the range of 60 to 150 g/mol. Particularly preferred are 1,2-ethanediol, 1,3-propanediol, 1,4-butanediol, 1,5-pentanediol, 1,6-hexanediol, 1,3-cyclohexane dimethanol, 1,4-cyclohexane dimethanol and diethylene glycol. These alcohols improve particularly the strength of the membrane. Most preferred is 1,4-butanediol.

Further preferred low molecular weight alcohols are difunctional bromated alcohols such as dibromoneopentyl glycol. These alcohols improve particularly the flame retarding properties of the membrane.

Preferably the isocyanate-functional polyurethane polymer is prepared from a polyol mixture containing at least 50 weight-%, more preferably at least 80 weight-%, and most preferably at least 90 weight-%, of polyether polyols.

In a particularly preferred embodiment, the isocyanate-functional polyurethane polymer is obtained from a combination of at least one polyether polyol with a molecular weight in the range of 500 to 6,000 g/mol and at least one diol with a molecular weight in the range of 60 to 150 g/mol, particularly 1,4-butanediol. Such an isocyanate-functional polyurethane polymer shows a low viscosity and provides good mechanical properties, particularly high strength.

Suitable polyisocyanates to obtain the isocyanate-functional polyurethane polymer are the following:

Aliphatic polyisocyanates, particularly 1,4-tetramethylene diisocyanate, 2-methylpentamethylene-1,5-diisocyanate, 1,6-hexanediisocyanate (HDI), 2,2,4- and 2,4,4-trimethyl-1,6-hexanediisocyanate (TMDI), 1,10-decanediisocyanate, 1,12-dodecanediisocyanate, lysine or lysine ester diisocyanate, cyclohexane-1,3- and -1,4-diisocyanate, 1-methyl-2,4- and -2,6-diisocyanatocyclohexane and any mixtures of these isomers ($H_6$TDI), 1-isocyanato-3,3,5-trimethyl-5-isocyanatomethyl-cyclohexane (isophoronediisocyanate or IPDI), perhydro-2,4'- and -4,4'-diphenylmethane diisocyanate ($H_{12}$MDI), 1,4-diisocyanato-2,2,6-trimethylcyclohexane (TMCDI), 1,3- and 1,4-bis-(isocyanatomethyl) cyclohexane, m- and p-xylylene diisocyanate (m- and p-XDI), m- and p-tetramethyl-1,4-xylylene diisocyanate (m- and p-TMXDI), bis-(1-isocyanato-1-methylethyl)naphthalene, dimer or trimer fatty acid isocyanates, such as 3,6-bis-(9-isocyanatononyl)-4,5-di-(1-heptenyl)cyclohexene (dimeryl diisocyanate), and $\alpha,\alpha,\alpha',\alpha',\alpha'',\alpha''$-hexamethyl-1,3,5-mesitylene triisocyanate. Preferred thereof are HDI, TMDI, IPDI and $H_{12}$MDI.

Aromatic polyisocyanates, particularly 4,4'-diphenylmethane diisocyanate, 2,4'-diphenylmethane diisocyanate and/or 2,2'-diphenylmethane diisocyanate and any mixtures of these isomers (MDI), 2,4- and/or 2,6-toluylene diisocyanate and any mixtures of these isomers (TDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODD, dianisidine diisocyanate (DADI), 1,3,5-tris-(isocyanatomethyl)benzene, tris-(4-isocyanatophenyl)methane and tris-(4-isocyanatophenyl)thiophosphate. Preferred thereof are MDI and TDI. Most preferred is MDI.

It can be advantageous to use mixtures of MDI with oligomers or polymers or derivatives of MDI, preferably so-called modified MDI containing carbodiimides or uretonimines of MDI, which are commercially available e.g. as Desmodur® CD (from Bayer), Lupranate® MM 103 (from BASF) or Isonate® M 143 and Isonate® M 309 (from Dow), as well as so-called polymeric MDI or PMDI representing mixtures of MDI with homologues of MDI, preferably with a low content of MDI homologues, such as Desmodur® VL50 (from Bayer) and Voranate® M 2940 (from Dow). A particularly preferred form of MDI is an MDI isomer mixture comprising 4,4'-diphenylmethane diisocyanate and 2,4'-diphenylmethane diisocyanate in about equal amounts, commercially available e.g. as Desmodur® 2424 (from Bayer) or Lupranate® MI (from BASF).

In one embodiment of the invention the isocyanate-functional polyurethane polymer is preferably an aliphatic isocyanate-functional polyurethane polymer. The use of an aliphatic isocyanate-functional polyurethane polymer enables membranes with an excellent light-fastness, i.e. yellowing resistance under sunlight exposure, as well as good UV-resistance, and it provides a low viscosity and a very good storage stability.

The aliphatic isocyanate-functional polyurethane polymer is obtained from a polyol as given above and an aliphatic diisocyanate. Preferred aliphatic diisocyanates are HDI, TMDI, IPDI and $H_{12}$MDI. Most preferred are IPDI and $H_{12}$MDI, in particular IPDI. Such polymers provide low viscous membranes having particularly high strength and high elongation and particularly good durability.

In another embodiment of the invention the isocyanate-functional polyurethane polymer is preferably an aromatic isocyanate-functional polyurethane polymer. The use of an aromatic isocyanate-functional polyurethane polymer is interesting from a cost point of view. It enables membranes with a good shelf life stability, especially with selected aldimines.

The aromatic isocyanate-functional polyurethane polymer is obtained from a polyol as given above and an aromatic polyisocyanate. Preferred aromatic polyisocyanates are MDI, TDI, particularly MDI. MDI is preferred from an EHS point of view since it has a very low volatility. Moreover MDI is inexpensive and affords fast curing properties and high strength membranes.

The one-part moisture-curing liquid-applied waterproofing membrane further comprises at least one aldimine of the formula (I), which is a long-chain polyether aldimine.

$$A \!-\!\!\left[ N \diagup\!\!\diagdown Z \right]_m \quad (I)$$

Preferably A is a divalent or a trivalent hydrocarbyl moiety of average molecular weight in the range of 1,000 to 4,000 g/mol containing ether groups. Such aldimines provide membranes with a particularly low viscosity.

More preferably A is a divalent or a trivalent hydrocarbyl moiety of average molecular weight in the range of 1,000 to 3,000 g/mol containing oxyethylene units and/or 1,2-oxypropylene units. Such aldimines of formula (I) are easily available and provide low viscous membranes with good mechanical properties. With a certain amount of oxyethylene units, they provide membranes with an especially high tolerance towards humidity or water during application.

More preferably A is a divalent or a trivalent hydrocarbyl moiety of average molecular weight in the range of 1,000 to 3,000 g/mol containing mostly 1,2-oxypropylene units. These aldimines provide membranes with an especially low viscosity and with a low water uptake and a very good durability.

Most preferably A is a divalent hydrocarbyl moiety of average molecular weight in the range of 1,200 to 2,500 g/mol containing mostly 1,2-oxypropylene units. Such an aldimine provides membranes with a particularly low viscosity, with high strength and very good durability.

Preferably m is 2. These aldimines provide membranes with a particularly low viscosity.

Preferably Z is a straight or branched alkyl or a cycloalkyl, in particular 2-propyl or 3-heptyl.

More preferably Z is a 5- to 6-membered aryl or heteroaryl, in particular phenyl, which is optionally substituted. These aldimines provide membranes having low viscosity and good shelf life stability, also with aromatic isocyanate-functional polyurethane polymers.

More preferably Z is a monovalent moiety of the formula $$\diagdown\!\!\diagup^{Y},_{R^1\ R^2}$$

wherein
Y is a monovalent $C_1$ to $C_{20}$ hydrocarbyl moiety optionally containing ether, carbonyl, ester, amido, urethane, urea or tertiary amino groups, and $R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring.

These aldimines provide membranes having low viscosity, good shelf life stability as well as fast, reliable curing properties.

Preferably Y is methyl or ethyl. These aldimines are preferred for applications which are not critical concerning odour.

More preferably Y is defined as given in formula (I a).

A particularly preferred aldimine of the formula (I) is an aldimine of the formula (I a), $$A \!-\!\!\left[ N = \diagdown\!\!\diagup^{R^3}_{R^1\ R^2}\!\!-\!X \right]_m \quad (I\ a)$$

wherein
m, A, $R^1$ and $R^2$ have the already mentioned meanings,
$R^3$ is hydrogen or a linear or branched $C_1$ to $C_{12}$ alkyl or arylalkyl or alkoxycarbonyl, and
X is a monovalent moiety of the formulae $$\diagdown\!\!N\!\!\diagup^{R^5}_{R^4} \quad or \quad \diagdown\!\!O\!\!-\!\!\overset{O}{\underset{}{C}}\!\!-\!R^6,$$

wherein
$R^4$ and $R^5$ are the same or different linear or branched $C_1$ to $C_{20}$ alkyls or cycloalkyls or aralkyls optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group, and
$R^6$ is hydrogen or a monovalent $C_2$ to $C_{20}$ hydrocarbyl moiety optionally containing ether, carbonyl or ester groups.

These aldimines provide low odour membranes as well as fast, reliable curing properties, having particularly low viscosity and high flexibility.

Preferably $R^1$ and $R^2$ are each methyl. These aldimines provide membranes having low viscosity as well as fast, reliable curing properties.

Preferably $R^3$ is hydrogen. These aldimines provide membranes having low viscosity as well as fast, reliable curing properties.

Preferably $R^4$ and $R^5$ are each a linear or branched $C_1$ to $C_8$ alkyl or cycloalkyl or aralkyl optionally containing ether groups, or are joined together to form a divalent linear or branched $C_4$ to $C_8$ hydrocarbyl moiety which is part of a 5- to 8-membered heterocyclic ring which, besides the nitrogen atom, may contain an ether or thioether or tertiary amino group.

More preferably $R^4$ and $R^5$ are each a methoxyethyl group or are joined together to form, including the nitrogen atom, a morpholine or a 2,6-dimethylmorpholine ring.

Most preferably $R^4$ and $R^5$ form a morpholine ring together with the nitrogen atom.

These aldimines provide membranes with a very good shelf life stability in combination with aliphatic isocyanate-functional polyurethane polymers, very fast curing properties and high strength.

Preferably $R^6$ is a $C_6$ to $C_{11}$ alkyl, most preferably a $C_{11}$ alkyl. These aldimines provide low odour to odourless membranes with a very good shelf life stability in combination with aliphatic and with aromatic isocyanate-functional polyurethane polymers, having particularly low viscosity and high flexibility.

Particularly preferred are aldimines of the formula (I a) wherein $R^1$ and $R^2$ are methyl, $R^3$ is hydrogen and $R^4$ and $R^5$ form a morpholine ring together with the nitrogen atom.

Particularly preferred are further aldimines of the formula (I a) wherein $R^1$ and $R^2$ are methyl, $R^3$ is hydrogen and $R^6$ is $C_{11}$ alkyl.

Particularly preferred aldimines of the formula (I) are selected from the group consisting of N,N'-bis(2,2-dimethyl-3-(N-morpholino)-propylidene)-polyoxypropylenediamines with an average molecular weight in the range of 1,300 to 4,400 g/mol, N,N'-bis(2,2-dimethyl-3-lauroyloxypropylidene)-polyoxypropylenediamines with an average molecular weight in the range of 1,500 to 4,600 g/mol, N,N',N''-tris(2,2-dimethyl-3-(N-morpholino)-propylidene)-polyoxypropylenetriamines with an average molecular weight in the range of 3,000 to 4,000 g/mol, N,N',N''-tris(2,2-dimethyl-3-lauroyloxypropylidene)-polyoxypropylenetriamines with an average molecular weight in the range of 3,300 to 4,300 g/mol, N,N'-bis(2,2-dimethyl-3-(N-morpholino)-propylidene)-polyoxyethylene-polyoxypropylenediamines with an average molecular weight in the range of 2,000 to 2,600 g/mol and N,N'-bis(2,2-dimethyl-3-lauroyloxypropylidene)-polyoxyethylene-polyoxypropylenediamines with an average molecular weight in the range of 2,200 to 2,900 g/mol.

Particularly preferred thereof are N,N'-bis(2,2-dimethyl-3-(N-morpholino)-propylidene)-polyoxypropylenediamines with an average molecular weight in the range of 2,000 to 2,600 g/mol. These aldimines provide membranes with very low viscosity and high strength and high durability and very good shelf life stability with aliphatic isocyanate-functional polyurethane polymers.

Further particularly preferred thereof are N,N'-bis(2,2-dimethyl-3-lauroyloxypropylidene)-polyoxypropylenediamines with an average molecular weight in the range of 2,200 to 2,900 g/mol. These aldimines provide membranes with a particularly low viscosity and high elongation and high durability and very good shelf life stability with both aromatic and aliphatic isocyanate-functional polyurethane polymers.

Further preferred thereof are N,N'-bis(2,2-dimethyl-3-(N-morpholino)-propylidene)-polyoxyethylene-polyoxypropylenediamines with an average molecular weight in the range of 2,000 to 2,600 g/mol and N,N'-bis(2,2-dimethyl-3-lauroyloxypropylidene)-polyoxyethylene-polyoxypropylenediamines with an average molecular weight in the range of 2,200 to 2,900 g/mol. Such aldimines are based on aminated polyether polyols in the form of propoxylated polyoxyethylene diols, commercially available from Huntsman as Jeffamine® ED-2003 for example. These aldimines provide membranes with a particularly high tolerance towards water and humidity during application and curing of the membrane. They are particularly useful if water is actively mixed into the membrane before its application.

The one-part moisture-curing liquid-applied waterproofing membrane further comprises at least one hardener which is an oxazolidine or an aldimine different from formula (I).

Suitable oxazolidines are oxazolidines of the formula (II),

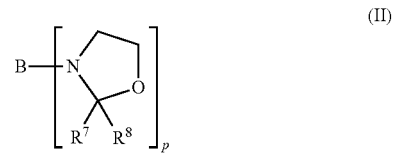

wherein
p is 2 or 3;
B is a bivalent or trivalent hydrocarbyl moiety of molecular weight in the range of 28 to 500 g/mol optionally containing ether, ester, amide, carbonate, urethane or urea groups, and $R^7$ and $R^8$ are independently selected from hydrogen or $C_1$ to $C_{12}$ linear or branched alkyl.

Such oxazolidines are hardeners which hydrolize with water to aminoalcohols, setting free the corresponding aldehyde or ketone $R^7C(O)R^8$.

Preferably p is 2.
Preferably B is an bivalent hydrocarbyl moiety of molecular weight in the range of 118 to 500 g/mol containing carbonate or urethane groups.

Preferably $R^7$ is hydrogen.
Preferably $R^8$ is a $C_3$ to $C_7$ branched alkyl, particularly preferred 2-propyl and 3-heptyl.

Such oxazolidines provide membranes with high elongation and high strength.

Particularly preferred are oxazolidines of the formula (II) wherein $R^7$ is hydrogen and $R^8$ is 2-propyl or 3-heptyl.

Particularly preferred are oxazolidines wherein the formula (II) correspond to the formulae (II a) or (II b).

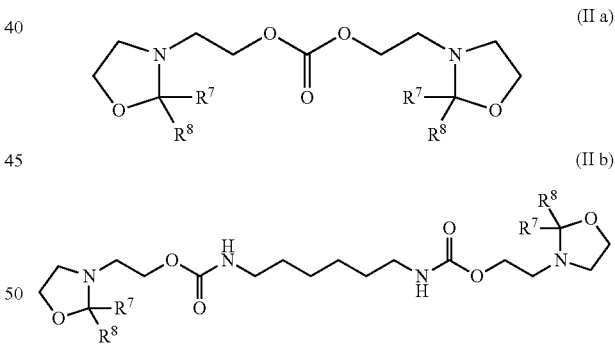

In the formulae (II a) and (II b) $R^7$ and $R^8$ have the already mentioned meanings.

Oxazolidines of the formula (II a) provide membranes with a good shelf life stability in combination with aliphatic isocyanate-functional polyurethane polymers, having particularly low viscosity.

Oxazolidines of the formula (II b) provide membranes with a good shelf life stability in combination with aliphatic isocyanate-functional polyurethane polymers, having fast curing properties and particularly high strength.

Particularly preferred oxazolidines of formula (II) are those commercially available under the trade names Incozol® LV, Incozol® 4, Incozol® HP, Incozol® NC, Incozol® CF and Incozol® EH (all from Incorez).

The oxazolidines of the formula (II) are derivatives of N-(2-hydroxyethyl)-tetrahydrooxazoles, the latter being obtainable via the condensation reaction of diethanolamine with aldehydes or ketones, particularly with isobutyraldehyde or 2-ethylhexanal.

The oxazolidines of the formula (II a) are obtainable by the reaction of an N-(2-hydroxyethyl)-tetrahydrooxazole with an organic carbonate, whereas the oxazolidines of the formula (II b) are obtainable by the reaction of an N-(2-hydroxyethyl)-tetrahydrooxazole with 1,6-hexanediisocyanate (HDI).

A preferred aldimine different from formula (I) is an aldimine of the formula (III),

(III)

wherein
n is 2 or 3,
G is a divalent or trivalent hydrocarbyl moiety of molecular weight in the range of 28 to 500 g/mol optionally containing ether or urethane groups, and
Z has the already mentioned meanings.

In a preferred embodiment of the invention, G is preferably a divalent or a trivalent hydrocarbyl moiety of average molecular weight in the range of 180 to 500 g/mol containing 1,2-oxypropylene units. These aldimines provide membranes with high elongation and fast curing properties. Most preferably G is either a divalent hydrocarbyl moiety of average molecular weight in the range of 200 to 250 g/mol containing 1,2-oxypropylene units or a trivalent hydrocarbyl moiety of average molecular weight in the range of 380 to 450 g/mol containing 1,2-oxypropylene units, particularly a trivalent hydrocarbyl moiety of average molecular weight in the range of 380 to 450 g/mol containing 1,2-oxypropylene units. These aldimines provide membranes with a high strength and particularly fast curing properties.

In a further preferred embodiment of the invention, G is preferably a divalent hydrocarbyl moiety of molecular weight in the range of 28 to 400 g/mol, preferably 80 to 250 g/mol.

Most preferably G is the moiety remaining when removing the primary amino groups of a diamine selected from the group consisting of hexamethylene-1,6-diamine, 2-methylpentane-1,5-diamine, 3-aminomethyl-3,5,5-trimethylcyclohexylamine (isophoronediamine), 2,2,4- and 2,4,4-trimethylhexamethylenediamine, 1,3-bis(aminomethyl)benzene, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)-bis-(aminomethyl)bicyclo[2.2.1]heptane, 3(4),8(9)-bis(aminomethyl)-tricyclo[5.2.1.0$^{2,6}$]decane, 1,2-diaminocyclohexane, 1,3-diaminocyclohexane, 1,4-diaminocyclohexane, 2,2,6-trimethylcyclohexane-1,4-diamine, 3,6-dioxaoctane-1,8-diamine, 4,7-dioxadecane-1,10-diamine, 4-aminomethyl-1,8-octanediamine, 1,3-phenylenediamine, 1,4-phenylenediamine, 2,4- and 2,6-toluylenediamine and 4,4'-, 2,4'- and 2,2'-diaminodiphenylmethane.

Preferred thereof are hexamethylene-1,6-diamine and 3-aminomethyl-3,5,5-trimethylcyclohexylamine, particularly preferred is 3-aminomethyl-3,5,5-trimethylcyclohexylamine.

These aldimines provide membranes with a particularly high strength.

The substituents Z in the aldimine of the formula (I) and the aldimine of the formula (III) can be identical or different.

A particularly preferred aldimine of the formula (III) is an aldimine of the formula (III a),

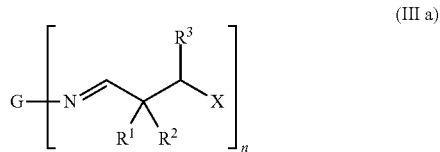

(III a)

wherein
n, G, $R^1$, $R^2$ and $R^3$ have the already mentioned meanings, and
X is a monovalent moiety of the formulae

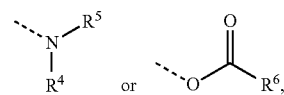

wherein
$R^4$, $R^5$ and $R^6$ have the already mentioned meanings.

These aldimines provide low odour membranes with fast and reliable curing properties, having particularly low viscosity and high strength and flexibility.

Particularly preferred are aldimines of the formula (III a) wherein $R^1$ and $R^2$ are methyl, $R^3$ is hydrogen and $R^4$ and $R^5$ form a morpholine ring together with the nitrogen atom.

Particularly preferred are further aldimines of the formula (III a) wherein $R^1$ and $R^2$ are methyl, $R^3$ is hydrogen and $R^6$ is $C_{11}$ alkyl.

Particularly preferred aldimines of the formula (III) are selected from the group consisting of N,N'-bis(2,2-dimethyl-3-(N-morpholino)-propylidene)-hexamethylene-1,6-diamine, N,N'-bis(2,2-dimethyl-3-(N-morpholino)-propylidene)-3-aminomethyl-3,5,5-trimethylcyclohexylamine, N,N'-bis(2,2-dimethyl-3-(N-morpholino)-propylidene)-polyoxypropylenediamines with an average molecular weight in the range of 500 to 600 g/mol, N,N',N"-tris(2,2-dimethyl-3-(N-morpholino)-propylidene)-polyoxypropylenetriamines with an average molecular weight in the range of 850 to 950 g/mol, N,N'-bis(2,2-dimethyl-3-lauroyloxypropylidene)-hexamethylene-1,6-diamine, N,N'-bis(2,2-dimethyl-3-lauroyloxypropylidene)-3-aminomethyl-3,5,5-trimethylcyclohexylamine, N,N'-bis(2,2-dimethyl-3-lauroyloxypropylidene)-polyoxypropylenediamines with an average molecular weight in the range of 710 to 810 g/mol and N,N',N"-tris(2,2-dimethyl-3-lauroyloxypropylidene)-polyoxypropylenetriamines with an average molecular weight in the range of 1,190 to 1,290 g/mol.

Preferred thereof are the aldimines containing the 2,2-dimethyl-3-(N-morpholino)-propylidene units. These aldimines provide low odour membranes with a very good shelf life stability in combination with aliphatic isocyanate-functional polyurethane polymers, having low viscosity, particularly fast curing properties and particularly high strength.

Further preferred thereof are the aldimines containing the 2,2-dimethyl-3-lauroyloxypropylidene units. These aldimines provide odourless membranes with a very good shelf life stability with both aliphatic and aromatic isocyanate-functional polyurethane polymers, having particularly low viscosity, fast curing properties and high flexibility.

Particularly preferred thereof are N,N'-bis(2,2-dimethyl-3-(N-morpholino)-propylidene)-hexamethylene-1,6-diamine and N,N'-bis(2,2-dimethyl-3-lauroyloxypropylidene)-hexamethylene-1,6-diamine. These aldimines provide membranes with a particularly low viscosity.

Particularly preferred thereof are further N,N'-bis(2,2-dimethyl-3-(N-morpholino)-propylidene)-3-aminomethyl-3,5,5-trimethylcyclohexylamine and N,N'-bis-(2,2-dimethyl-3-lauroyloxypropylidene)-3-aminomethyl-3,5,5-trimethylcyclohexylamine. These aldimines provide membranes with a particularly high strength and durability.

Particularly preferred thereof are further N,N',N"-tris(2,2-dimethyl-3-(N-morpholino)-propylidene)-polyoxypropylenetriamines with an average molecular weight in the range of 850 to 950 g/mol and N,N',N"-tris(2,2-dimethyl-3-lauroyloxypropylidene)-polyoxypropylenetriamines with an average molecular weight in the range of 1,190 to 1,290 g/mol. These aldimines provide membranes with particularly fast curing properties.

Most preferred is a combination of N,N'-bis(2,2-dimethyl-3-(N-morpholino)-propylidene)-3-aminomethyl-3,5,5-trimethylcyclohexylamine and N,N',N"-tris(2,2-dimethyl-3-(N-morpholino)-propylidene)-polyoxypropylenetriamines with an average molecular weight in the range of 850 to 950 g/mol. Combinations of these aldimines provide membranes with a good balance between fast curing properties and high strength, flexibility and durability.

An aldimine of the formula (I) is preferably available from a condensation reaction of at least one primary polyamine of the formula (IV) and at least one aldehyde of the formula (VI).

An aldimine of the formula (III) is preferably available from a condensation reaction of at least one primary polyamine of the formula (V) and at least one aldehyde of the formula (VI).

In the formulae (IV), (V) and (VI) m, n, A, G and Z have the already mentioned meanings.

For this condensation reaction, the aldehyde of the formula (VI) is used stoichiometrically or in excess related to the primary amino groups of the primary polyamine of the formula (IV) or of the formula (V). The reaction can advantageously be conducted at a temperature in the range between 15 and 120° C., either in the presence of a solvent or without a solvent. The released water is being removed either azeotropically with a suitable solvent, or directly under vacuum.

Particularly suitable amines of the formula (IV) are polyoxyalkylenediamines and -triamines with an average molecular weight in the range of 800 to 4,000 g/mol, commercially available from Huntsman, BASF and Nitroil, such as Jeffamine® ED-900, Jeffamine® ED-2003, Jeffamine® D-2000, Jeffamine® D-4000 and Jeffamine® T-3000, particularly Jeffamine® D-2000 and Jeffamine® T-3000, as well as the corresponding grades from BASF or Nitroil, and further diamines derived from propoxylated polyoxyethylene diols, commercially available from Huntsman as Jeffamine® ED-900 and Jeffamine® ED-2003.

Particularly suitable amines of the formula (V) are hexamethylene-1,6-diamine, 2-methylpentane-1,5-diamine, 3-aminomethyl-3,5,5-trimethylcyclohexylamine (isophoronediamine), 2,2,4- and 2,4,4-trimethylhexamethylenediamine, 1,3-bis(aminomethyl)benzene, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)-bis-(aminomethyl)bicyclo[2.2.1]heptane, 3(4),8(9)-bis(aminomethyl)-tricyclo[5.2.1.0$^{2,6}$]decane, 1,2-diaminocyclohexane, 1,3-diaminocyclohexane, 1,4-diaminocyclohexane, 2,2,6-trimethylcyclohexane-1,4-diamine, 3,6-dioxaoctane-1,8-diamine, 4,7-dioxadecane-1,10-diamine, 4-aminomethyl-1,8-octanediamine, polyoxyalkylenediamines and -triamines with an average molecular weight in the range of 200 to 500 g/mol, commercially available from Huntsman, BASF and Nitroil, such as Jeffamine® D-230, Jeffamine® D-400 and Jeffamine® T-403, as well as the corresponding grades from BASF or Nitroil, further 1,3-phenylenediamine, 1,4-phenylenediamine, 2,4- and 2,6-toluylenediamine and 4,4'-, 2,4'- and 2,2'-diaminodiphenylmethane. Preferred thereof are hexamethylene-1,6-diamine, 3-aminomethyl-3,5,5-trimethylcyclohexylamine (isophoronediamine), Jeffamine® D-230 and Jeffamine® T-403 from Huntsman as well as the corresponding grades from BASF or Nitroil. Particularly preferred are hexamethylene-1,6-diamine, 3-aminomethyl-3,5,5-trimethylcyclohexylamine (isophoronediamine) and Jeffamine® T-403 from Huntsman as well as the corresponding grade from BASF or Nitroil.

Suitable aldehydes of the formula (VI) are particularly isobutyraldehyde, 2-ethylhexanal, pivalaldehyde, 2,2-diethylbutanal, benzaldehyde, 2,2-dimethyl-3-(N,N-bis(methoxyethyl))amino-propanal, 2,2-dimethyl-3-(N-morpholino)-propanal, 2,2-dimethyl-3-(N-(2,6-dimethyl)morpholino)-propanal and 2,2-dimethyl-3-lauroyloxypropanal.

Preferred thereof are benzaldehyde, 2,2-dimethyl-3-(N,N-bis(methoxyethyl))-amino-propanal, 2,2-dimethyl-3-(N-morpholino)-propanal, 2,2-dimethyl-3-(N-(2,6-dimethyl)morpholino)-propanal and 2,2-dimethyl-3-lauroyloxypropanal. Particularly preferred are 2,2-dimethyl-3-(N-morpholino)-propanal and 2,2-dimethyl-3-lauroyloxypropanal.

The use of an aldimine of the formula (III) as hardener is preferred over the use of an oxazolidine of the formula (II), particularly due to benefits related to shelf life, odour and curing properties.

In a preferred embodiment, the liquid-applied membrane comprises
  at least one aliphatic isocyanate-functional polyurethane polymer, particularly derived from IPDI;
  at least one aldimine of the formula (I), particularly of the formula (I a); and
  at least one aldimine of the formula (III a) wherein X is N-morpholino.

Such membranes have a low viscosity, good shelf life stability, good light-fastness and good UV-stability.

In further preferred embodiment, the liquid-applied membrane comprises
  at least one aromatic isocyanate-functional polyurethane polymer, particularly derived from MDI;
  at least one aldimine of the formula (I); and
  at least one aldimine of the formula (III) wherein Z is phenyl.

Such membranes have a good shelf life stability, fast curing properties and are interesting from a cost point of view.

In further preferred embodiment, the liquid-applied membrane comprises
- at least one aromatic isocyanate-functional polyurethane polymer, particularly derived from MDI;
- at least one aldimine of the formula (I), particularly of the formula (I a); and
- at least one aldimine of the formula (III a) wherein X is lauroyloxy.

Such membranes have a good shelf life stability, fast curing properties, are interesting from a cost point of view and enable odourless membranes.

In one embodiment of the invention, the liquid-applied membrane can be mixed with water short before its application. Such a membrane comprises preferably
- at least one isocyanate-functional polyurethane polymer, preferably derived from an aliphatic polyisocyanate, particularly IPDI;
- at least one aldimine of the formula (I) wherein A is a divalent hydrocarbyl moiety containing oxyethylene units, and
- at least one hardener which is an oxazolidine or an aldimine different from formula (I).

To such a membrane water can be added in an amount of up to 30 weight-%, preferably in an amount of 5 to 20 weight-%, referred to the total membrane. The incorporated water can have a viscosity reducing effect to the membrane and can increase the cure speed. The aldimine of the formula (I) containing oxyethylene units helps to achieve a good water compatibility so that the membrane and the water are easily miscible and the membrane cures to a layer without gassing, having an even surface free from cavities, wholes or inhomogeneous parts.

In a preferred embodiment the liquid-applied membrane contains aldimines of the formula (I) and hardeners selected from oxazolidines and aldimines different from formula (I) in such an amount, that the ratio between the number of aldimino groups from aldimines of the formula (I) and the number of isocyanate-reactive groups from oxazolidines and aldimines different from formula (I) is in the range of 1/99 to 50/50, preferably 2/98 to 40/60, more preferably 3/97 to 30/70, most preferably 4/96 to 25/75. In this ratio range, the membrane features a very low viscosity at low solvent content and high strength and flexibility.

Preferably the total content of aldimines and optionally oxazolidines in the liquid-applied membrane is such that the ratio between the total number of isocyanate-reactive groups from aldimines and oxazolidines to the number of isocyanate groups is in the range of 0.3 to 1.5, preferably 0.4 to 1.4, more preferably 0.5 to 1.3.

If the membrane is free from oxazolidines, the total aldimine content is preferably such that the ratio between the total number of aldimino groups to the number of isocyanate groups is in the range of 0.3 to 1.0, preferably 0.4 to 0.95, more preferably 0.5 to 0.9.

In this range, the membrane cures quickly without the formation of bubbles or blisters to a flexible material of high strength.

Besides the ingredients already mentioned, the liquid-applied membrane may comprise further ingredients.

Preferably the liquid-applied membrane comprises at least one flame-retarding plasticizer, particularly a phosphate or a phosphonate, particularly triphenyl phosphate (TPP), diphenyl-tert.butylphenyl phosphate, diphenylcresyl phosphate (DPK), tricresyl phosphate (TKP), triethyl phosphate, tris(2-ethylhexyl)phosphate, diphenyl-2-ethylhexyl phosphate (DPO), tris(2-ethylhexyl)phosphate (TOF), diphenylisodecyl phosphate, dimethyl propane phosphonate (DMPP), tetraphenyl resorcinol diphosphate, resorcinol diphosphate oligomer (RDP), ethylenediamine diphosphate, as well as chloroalkyl phosphate esters such as tris(1-chloro-2-propyl)phosphate, tris(1,3-dichloro-2-propyl)phosphate and 2,2-bis(chloromethyl)trimethylene bis(bis(2-chloroethyl)phosphate). Particularly preferred thereof is DPK.

Preferably the liquid-applied membrane further comprises at least one flame-retarding filler. Preferred flame-retarding fillers are aluminum trihydroxide (ATH), magnesium dihydroxide, antimony trioxide, antimony pentoxide, boric acid, zinc borate, zinc phosphate, melamine borate, melamine cyanurate, ethylenediamine phosphate, ammonium polyphosphate, di-melamine orthophosphate, di-melamine pyrophosphate, hexabromocyclododecane, decabromodiphenyl oxide and tris(bromoneopentyl)phosphate. Particularly preferred thereof is ATH.

The membrane preferably comprises a further filler, particularly calcium carbonate (chalk), barium sulfates (barytes), slate, silicates (quartz), magnesiosilicates (talc) and alumosilicates (clay, kaolin). These fillers may or may not carry a surface coating, e.g. a stearate or a siloxane coating. Such fillers can increase strength and durability of the membrane.

The membrane preferably comprises at least one metal-based catalyst. Preferred metal-based catalysts are dialkyltin complexes, particularly dibutyltin(IV) or dioctyltin(IV) carboxylates or acetoacetonates, such as dibutyltindilaurate (DBTDL), dibutyltindiacetylacetonate, dioctyltindilaurate (DOTDL), further bismuth(III) complexes such as bismuth-octoate or bismuthneodecanoate, zinc(II) complexes, such as zincoctoate or zincneodecanoate, and zirconium(IV) complexes, such as zirconiumoctoate or zirconiumneodecanoate. Such catalysts can accelerate the reaction of the isocyanate groups.

The membrane preferably comprises at least one acid catalyst. Preferred acid catalysts are carboxylic acids and sulfonic acids, particularly aromatic carboxylic acids such as benzoic acid or salicylic acid. Such catalysts can accelerate the hydrolysis of aldimino groups.

The membrane preferably comprises at least one pigment. Preferred pigments are titanium dioxide, iron oxides and carbon black. The pigment defines the colour of the membrane, helps to develop strength and can improve durability, particularly UV-stability.

The membrane preferably comprises at least one UV-stabilizer. Preferred UV-stabilizers are UV-absorbers such as 2-cyano-3,3-diphenylacrylic acid ethyl ester, and hindered amine light stabilizers (HALS) such as bis(1,2,2,6,6-pentamethyl-4-piperidyl) sebacate. UV-stabilizers help to prevent the polymer from degradation under light exposure.

The membrane preferably comprises at least one polyisocyanate crosslinker. Preferred polyisocyanate crosslinkers are oligomers and similar derivatives from diisocyanates such as MDI, TDI, HDI and IPDI. Preferred aliphatic polyisocyanate crosslinkers are HDI-biurets, such as Desmodur® N 100 and N 3200 (from Bayer), Tolonate® HDB and HDB-LV (from Rhodia) and Duranate® 24A-100 (from Asahi Kasei); HDI-isocyanurates, such as Desmodur® N 3300, N 3600 and N 3790 BA (all from Bayer), Tolonate® HDT, HDT-LV and HDT-LV2 (all from Rhodia), Duranate® TPA-100 and THA-100 (from Asahi Kasei) and Coronate® HX (from Nippon Polyurethane); HDI-uretidiones such as Desmodur® N 3400 (from Bayer); HDI-iminooxadiazinediones such as Desmodur® 3900 (from Bayer); HDIallophanates such as Desmodur® VP LS 2102 (from Bayer) and Basonat® HA 100, Basonat® HA 200 and Basonat® HA 300 (all from BASF); IPDI-isocyanurates such as Desmodur® Z 4470 (from Bayer) and Vestanat® T1890/100 (from Evonik); mixed isocyanurates based on IPDI/HDI, such as Desmodur® NZ 1 (from Bayer). Preferred aromatic polyisocyanate crosslinkers are TDI-oligomers such as Desmodur® IL (from Bayer); modified MDI containing carbodiimides or uretonimines of MDI such as the already mentioned ones; polymeric MDI or PMDI such as the already mentioned ones as well as Desmodur® VL, Desmodur® VL R10, Desmodur® VL R20, Voranate® M 220, Voranate® M 229 and Voranate® M 580 (all from Dow) or Lupranate® M 10 R, Lupranate® M 20 S, Lupranate® M 50, Lupranate® M 70 R, Lupranate® M 200 R (all from BASF). Mixed aromatic/aliphatic polyisocyanate crosslinkers may also be used, in particular isocyanurates based on TDI/HDI, such as Desmodur® HL (from Bayer).

Aliphatic polyisocyanate crosslinkers are particularly preferred in membranes containing aliphatic isocyanate-functional polyurethane polymers. Particularly preferred are IPDI-isocyanurates and mixed isocyanurates containing IPDI. Aromatic polyisocyanate crosslinkers are particularly preferred in membranes containing aromatic isocyanate-functional polyurethane polymers.

Such polyisocyanate crosslinkers can act as drying agents and/or can help to develop high strength in the membrane.

The liquid-applied membrane may further comprise the following ingredients:
  plasticizers other than phosphates and phosphonates, particularly phthalates, trimellitates, adipates, sebacates, azelates, citrates, benzoates, acetylated glycerin or monoglycerides, hydrogenated phthalates and arylsulfonates;
  fillers other than the already mentioned ones such as dolomite, mica, glass bubbles and silicic acid, in particular highly dispersed silicic acids from pyrolytic processes (fumed silica), as well as microspheres and fibres;
  organic solvents such as hydrocarbons, esters or ethers, particularly acetyl acetone, mesityloxide, cyclohexanone, methylcyclohexanone, ethyl acetate, propyl acetate, 1-methoxy-2-propylacetate, butyl acetate, diethyl malonate, diisopropylether, diethylether, dibutylether, ethylene glycol diethylether, diethylene glycol diethylether, toluene, xylenes, heptanes, octanes, diisopropylnaphthalenes and petroleum fractions, such as naphtha, white spirits and petroleum ethers, such as Solvesso™ solvents (from Exxon), hydrogenated aromatic solvents such as hydrogenated naphtha, methylene chloride, propylene carbonate, butyrolactone, N-methyl-pyrrolidone and N-ethyl-pyrrolidone;
  additives such as wetting agents, flow enhancers, levelling agents, defoamers, deaerating agents, stabilizers, antioxidants, drying agents, adhesion promoters, rheology modifiers, particularly fumed silica, and biocides.

When using such further ingredients it is advantageous to ensure that they do not strongly impair the shelf life stability of the uncured membrane, i.e. do not massively trigger reactions leading to crosslinking of the polymer during storage. In particular these further ingredients should not contain any water above trace quantities. It can be advantageous to dry ingredients physically or chemically before use.

Preferably the content of the isocyanate-functional polyurethane polymer in the membrane is in the range of 15 to 70 weight-%, more preferably 15 to 60 weight-%, particularly 15 to 50 weight-%. This enables membranes with good durability and good mechanical properties.

Preferably the liquid-applied membrane has a filler content in the range of 20 to 80 weight-%, more preferably in the range of 30 to 60 weight-%, the filler including inorganic, organic and flame-retarding fillers and pigments. At this filler content the membrane provides high strength and durability.

A preferred liquid-applied membrane contains
  from 15 to 70 weight-% isocyanate-functional polyurethane polymers;
  from 20 to 80 weight-% fillers including flame-retarding fillers and pigments;
  from 5 to 30 weight-% plasticizers including flame-retarding plasticizers;
  and comprises at least one further ingredient selected from the group consisting of catalysts, solvents and UV-stabilizers.

Preferably, it comprises at least one flame-retarding ingredient selected from the group consisting of flame-retarding fillers and flame-retarding plasticizers. Such a membrane has good shelf life stability, good workability at low solvent content, good mechanical properties and durability and a low tendency to develop flames and smoke in case of fire.

Preferably the liquid-applied membrane has a low viscosity. This enables a good workability when applied as a self-levelling coating. Particularly the membrane has a Brookfield viscosity in the range of 2,000 to 15,000 mPa·s measured at 20° C., preferably in the range of 2,000 to 10,000 mPa·s at 20° C. In this viscosity range the membrane is self-levelling enough to allow easy application on flat or low slope roof surfaces but does not flow away into small cavities on the substrate surface.

Preferably the liquid-applied membrane has a low solvent content. It contains preferably 100 g VOC per liter or less, more preferably 50 g VOC per liter or less. At such low solvent content the membrane fulfills toughest VOC specifications, e.g. those of the South Coast Air Quality Management District. State-of-the-art one-part moisture-curing liquid-applied waterproofing membranes based on isocyanate-functional polyurethane polymers and blocked amine hardeners are difficult to formulate at low solvent content. Especially low viscosity and sufficient shelf life stability is difficult to achieve without the use of high amounts of solvents. In this invention it was surprisingly found that the use of an aldimine of the formula (I) is an effective method to lower the viscosity of a one-component liquid-applied membrane without significantly reducing the strength of the membrane.

A further subject of the invention is a method to lower the viscosity of a one-part moisture-curing liquid-applied waterproofing membrane comprising at least one isocyanate-functional polyurethane polymer with at least one aldimine of the formula (I).

Preferably the one-part moisture-curing liquid-applied waterproofing membrane in this method contains at least one hardener selected from oxazolidines and aldimines different from formula (I), as given before.

Preferably the aldimine of the formula (I) is used in such an amount that the ratio between the number of aldimino groups from aldimines of the formula (I) and the number of isocyanate-reactive groups from oxazolidines and aldimines different from formula (I) is in the range of 1/99 to 50/50, preferably 2/98 to 40/60, more preferably 3/97 to 30/70, most preferably 4/96 to 25/75. This method provides liquid-applied membranes having a particularly low viscosity at low solvent content, good shelf life stability, fast curing properties, as well as high strength and flexibility.

The one-part moisture-curing liquid-applied waterproofing membrane may be prepared by mixing all ingredients under exclusion of moisture to obtain a homogeneous fluid. It may be stored in a suitable moisture-tight container, particularly a bucket, a drum, a hobbock, a bag, a sausage, a cartridge, a can or a bottle.

In one embodiment of the invention, water is mixed into the membrane shortly before its application in order to further lower the viscosity and/or increase curing speed of the membrane. In this case, the water is preferably mixed into the liquid membrane with a dynamic mixing equipment until homogeneous.

The membrane is applied in liquid state within its open time, typically by pouring it onto the substrate, followed by spreading it, e.g. with a roller or a squeegee, to get the desired layer thickness, which is typically in the range of 0.5 to 3 mm, particularly 0.75 to 1.5 mm.

"Open time" means hereby the period of time between the exposure to moisture and the formation of a skin on the surface of the membrane, also called "tack-free time" or "skinning time".

The liquid-applied membrane is self-levelling, which means its viscosity is low enough to develop an even surface after being spread by rolling or brushing. The curing of the membrane starts when it gets in contact with moisture, typically atmospheric moisture or added water. The curing process works by chemical reaction. Both aldimino and oxazolidino groups are activated with moisture and then react with isocyanate groups. On activation, each aldimino group forms a primary amino group, while each oxazolidino group forms a secondary amino group and a hydroxyl group. Furthermore, the isocyanate groups can also react directly with moisture. As a result of these reactions, the membrane cures to a solid, elastic material. The curing process may also be called crosslinking. After curing, an elastic material with a very good adhesion to a large number of substrates is obtained.

In the course of the curing reaction, the blocking agents of the aldimines and oxazolidines are released. These blocking agents, depending on their volatility and other factors such as their solubility in the membrane, may evaporate from the membrane during or after curing, or may remain in the cured membrane. In the case of aldimines of the formula (I a) or (III a), the released aldehydes are of low odour and of good compatibility with the polyurethane matrix of the membrane. Particularly 2,2-dimethyl-3-(N-morpholino)propanal has an excellent compatibility with the polyurethane matrix, and particularly 2,2-dimethyl-3-lauroyloxypropanal is odourless and remains almost completely in the membrane, reducing odour, emission and shrinkage of the membrane.

The membrane can be applied onto various substrates, forming an elastic coating on the substrate. It can be used particularly for waterproofing a roof, a roof deck or a roof garden, as well as a planter, a balcony, a terrace, a plaza, or a foundation. It can also be used indoors for waterproofing, particularly under ceramic tiles, e.g. in a bath room, a catering kitchen or a plant room, protecting them from water ingress. The liquid-applied membrane is particularly suitable for refurbishment purposes.

Most preferred is the use of the liquid-applied membrane on a roof, particularly a flat or low slope roof. It can be used to waterproof a new roof as well as for refurbishment purposes and is particularly useful for detailing work.

The liquid-applied membrane is preferably used as part of a waterproofing system, consisting of
  optionally a primer and/or an undercoat,
  one or more than one layer of the membrane, preferably in combination with a fibre reinforcement mesh, and
  optionally a top coat.

The liquid-applied membrane is preferably used by being poured onto a substrate, being spread evenly within its open time to the desired layer thickness, typically in the range of 0.5 to 3 mm, particularly in the range of 0.75 to 1.5 mm, by a roller, a brush, a spreading knife or a wiper.

Preferably the fibre reinforcement mesh is applied after the first layer of the membrane, by placing it on top of the freshly applied membrane and then rolling or working it thoroughly into the membrane within the open time of the membrane, particularly by means of a roller or a brush. The membrane with the incorporated fibre reinforcement mesh is then cured at least to the point that it is walkable, before an optional next layer of the membrane is applied.

It can be advantageous to apply a top coat onto the top layer of the membrane, such as a covering lacquer or the like. Especially for membranes based on aromatic isocyanates, it is advantageous to apply an UV-resistant top coat onto the cured membrane.

Another subject of the invention is a method of waterproofing a roof structure, comprising
  applying the membrane in liquid state onto a substrate of the roof structure in a layer thickness in the range of 0.5 to 3 mm, particularly in the range of 0.75 to 1.5 mm;
  contacting the membrane with a fibre reinforcement mesh within the open time of the membrane;
  exposing the membrane to moisture to thereby cure the membrane partially or fully to obtain an elastic coating;
  optionally applying a second layer of the membrane in a layer thickness in the range of 0.5 to 3 mm, particularly in the range of 0.75 to 1.5 mm, and curing it by exposure to moisture.

The fibre reinforcement mesh is preferably a non-woven polyester fibre mesh and more preferably a non-woven glass fibre mesh.

The fibre reinforcement mesh acts as a reinforcement for the membrane, providing increased strength and durability. The randomly orientated fibres in the preferred non-woven fibre meshes give a multidirectional strength to the membrane while allowing it to remain highly elastic. It improves strength, tear resistance and puncture resistance. The non-woven glass fibre mesh shows a particularly easy handling, as it is not stiff, but easily adapts to the given surface topography.

Substrates onto which the membrane can be applied are particularly
  concrete, lightweight concrete, mortar, brick, adobe, tile, slate, gypsum and natural stone, such as granite or marble;
  metals and alloys, such as aluminium, copper, iron, steel, nonferrous metals, including surface-finished metals and alloys, such as galvanized metals and chrome-plated metals;
  asphalt;
  bituminous felt;
  plastics, such as PVC, ABS, PC, PA, polyester, PMMA, SAN, epoxide resins, phenolic resins, PUR, POM, PO, PE, PP, EPM, EPDM in untreated form or surface treated by means of plasma, corona or flame; particularly PVC, PO (FPO, TPO) or EPDM membranes;
  coated substrates, such as varnished tiles, painted concrete and coated metals.

It can be advantageous to pre-treat the substrate before applying the membrane, for example by washing, pressure-washing, wiping, blowing off, grinding and/or applying a primer and/or an undercoat.

By this method, a waterproof roof structure is obtained comprising the cured membrane with the incorporated fibre reinforcement mesh.

The roof structure is preferably part of the roof of a building, particularly a building from structural and civil engineering, preferably a house, an industrial building, a hangar, a shopping center, a sports stadium or the like.

The one-part moisture-curing liquid-applied waterproofing membrane described herein has a series of advantages.

It has a low viscosity at low solvent content, even when containing only about 50 g VOC per liter or less. It has a good shelf life stability, even with aromatic isocyanate-functional polyurethane polymers, particularly when selected aldimines of formula (I) and formula (III) are used. It has fast and reliable curing properties and a high tolerance towards humidity or water during application. This ensures that no bubble formation occurs when curing under humid outdoor conditions. Water can even actively be mixed into the membrane, thus providing further dilution and allowing easy application, without leading to curing defects. With selected aldimines, the membrane cures with very little or no odour, particularly when aldimines of the formula (I a) and (III a) are used. After curing, the membrane features a high strength and a high flexibility. These good mechanical properties afford high crack-bridging qualities in a broad temperature range and ensure high durability.

With these properties, the membrane is particularly suitable for use on a roof, particularly on a flat or low slope roof. It is particularly advantageous for detailing work and for refurbishment purposes.

EXAMPLES

"Normal climate" means a temperature of 23±1° C. and a relative atmospheric moisture of 50±5%.

1. Preparation of Aldimines:

The amine content (total content of free amines and blocked amines, i.e. aldimino groups) of the prepared aldimines was determined by titration (with 0.1N $HClO_4$ in acetic acid against crystal violet) and is given in mmol N/g.

Aldimine-A1: N,N'-bis(2,2-dimethyl-3-(N-morpholino)-propylidene)-polyoxypropylenediamine 2000 g (ca. 2 mol N) polyoxypropylenediamine of average molecular weight of about 2000 g/mol (Jeffamine® D-2000 from Huntsman, amine content 1.02 mmol N/g) were placed in a round bottom flask under nitrogen atmosphere. Then 360 g (2.1 mol) 2,2-dimethyl-3-(N-morpholino)-propanal were added under good stirring, followed by removing the volatile contents at 80° C. and 10 mbar vacuum. The yield was 2,318 g of a nearly colourless liquid with an amine content of 1.77 mmol N/g, corresponding to a calculated aldimine equivalent weight of approx. 1,135 g/Eq.

Aldimine-A2: N,N'-bis(2,2-dimethyl-3-lauroyloxy-propylidene)-polyoxypropylenediamine Under the same conditions as given for Aldimine-A1, 2000 g (ca. 2 mol N) polyoxypropylenediamine of average molecular weight of about 2000 g/mol (Jeffamine® D-2000 from Huntsman, amine content 1.02 mmol N/g) were reacted with 612 g (2.15 mol) 2,2-dimethyl-3-lauroyloxy-propanal. The yield was 2,575 g of a nearly colourless liquid with an amine content of 0.79 mmol N/g, corresponding to a calculated aldimine equivalent weight of approx. 1,260 g/Eq.

Aldimine-A3: N,N'-bis(2,2-dimethyl-3-(N-morpholino)-propylidene)-polyoxypropylenediamine Under the same conditions as given for Aldimine-A1, 2000 g (ca. 1 mol N) polyoxypropylenediamine of average molecular weight of about 4000 g/mol (Jeffamine® D-4000 from Huntsman, amine content 0.50 mmol N/g) were reacted with 180 g (1.05 mol) 2,2-dimethyl-3-(N-morpholino)-propanal. The yield was 2,160 g of a nearly colourless liquid with an amine content of 0.95 mmol N/g, corresponding to a calculated aldimine equivalent weight of approx. 2,175 g/Eq.

Aldimine-A4: N,N'-bis(2,2-dimethyl-3-(N-morpholino)-propylidene)-polyoxyethylene-polyoxypropylenediamine 2000 g (ca. 2.0 mol N) polyoxyethylene-polyoxypropylenediamine (Jeffamine® ED-2003 from Huntsman, amine content 1.00 mmol N/g) were molten at 50° C. and reacted with 360 g (2.1 mol) 2,2-dimethyl-3-(N-morpholino)-propanal under the same conditions as given for Aldimine-A1. The yield was 2,324 g of a nearly colourless liquid, which solidified to a waxy solid on standing at room temperature after several hours, with an amine content of 1.77 mmol N/g, corresponding to a calculated aldimine equivalent weight of approx. 1,160 g/Eq.

Aldimine-A5: N,N'-bis(2,2-dimethyl-3-lauroyloxy-propylidene)-polyoxyethylene-polyoxypropylenediamine 2000 g (ca. 2.0 mol N) polyoxyethylene-polyoxypropylenediamine (Jeffamine® ED-2003 from Huntsman, amine content 1.00 mmol N/g) were molten at 50° C. and reacted 612 g (2.15 mol) 2,2-dimethyl-3-lauroyloxy-propanal under the same conditions as given for Aldimine-A1. The yield was 2,575 g of a nearly colourless liquid, which solidified to a waxy solid on standing at room temperature after several hours, with an amine content of 0.78 mmol N/g, corresponding to a calculated aldimine equivalent weight of approx. 1,290 g/Eq.

Aldimine-R1: N,N',N''-tris(2,2-dimethyl-3-(N-morpholino)-propylidene)-polyoxypropylenetriamine Under the same conditions as given for Aldimine-A1, 2,500 g (ca. 1.3 mol N) polyoxypropylenetriamine of average molecular weight of about 5000 g/mol (Jeffamine® T-5000 from Huntsman, amine content 0.52 mmol N/g) were reacted with 231 g (1.35 mol) 2,2-dimethyl-3-(N-morpholino)-propanal. The yield was 2,701 g of a nearly colourless liquid with an amine content of 0.96 mmol N/g, corresponding to a calculated aldimine equivalent weight of approx. 2,075 g/Eq.

Aldimine-R2: N,N',N''-tris(2,2-dimethyl-3-lauroyloxypropylidene)-polyoxypropylenetriamine Under the same conditions as given for Aldimine-A1, 2,500 g (ca. 1.3 mol N) polyoxypropylenetriamine of average molecular weight of about 5000 g/mol (Jeffamine® T-5000 from Huntsman, amine content 0.52 mmol N/g) were reacted with 407 g (1.4 mol) 2,2-dimethyl-3-lauroyloxy-propanal. The yield was 2,883 g of a nearly colourless liquid with an amine content of 0.45 mmol N/g, corresponding to a calculated aldimine equivalent weight of approx. 2,215 g/Eq.

Aldimine-B1: N,N',N''-tris(2,2-dimethyl-3-(N-morpholino)-propylidene)-polyoxypropylenetriamine Under the same conditions as given for Aldimine-A1, 440 g (ca. 2.8 mol N) polyoxypropylenetriamine of average molecular weight of about 440 g/mol (Jeffamine® T-403 from Huntsman, amine content 6.40 mmol N/g) and 514 g (3.0 mol) 2,2-dimethyl-3-(N-morpholino)-propanal were reacted. The yield was 902 g of a nearly colourless liquid with an amine content of 6.44 mmol N/g, corresponding to a calculated aldimine equivalent weight of approx. 320 g/Eq.

Aldimine-B2: N,N'-bis(2,2-dimethyl-3-(N-morpholino)-propylidene)-3-aminomethyl-3,5,5-trimethylcyclohexylamine Under the same conditions as given for Aldimine-A1, 170.3 g (1 mol) 3-aminomethyl-3,5,5-trimethylcyclohexylamine (Vestamin® IPD from Evonik) and 359.5 g (2.1 mol) 2,2-dimethyl-3-(N-morpholino)-propanal were reacted. The yield was 493.2 g of a nearly colourless liquid with an amine content of 8.25 mmol N/g, corresponding to a calculated aldimine equivalent weight of approx. 247 g/Eq.

Aldimine-B3: N,N'-bis(2,2-dimethyl-3-(N-morpholino)-propylidene)-hexamethylene-1,6-diamine Under the same conditions as given for Aldimine-A1, 166.0 g (1 mol) hexamethylene-1,6-diamine solution (70 weight-% in water) and 359.5 g (2.1 mol) 2,2-dimethyl-3-(N-morpholino)-propanal were reacted. The yield was 439.1 g of a nearly colourless liquid with an amine content of 9.27 mmol N/g, corresponding to a calculated aldimine equivalent weight of approx. 219 g/Eq.

The Aldimines-A1 to -A5 are aldimines of the formula (I). The Aldimines-B1 to -B3 are aldimines of the formula (III). The Aldimines-R1 and -R2 are for comparison.

2. Preparation of Isocyanate-Functional Polyurethane Polymers;

The Polymer-1 was prepared by reacting 406.60 g diphenylcresyl phosphate (Disflamoll® DPK; from Lanxess), 906.1 g polyoxypropylene diol with an average molecular weight of ca. 1000 g/mol (Voranol® 1010 L from Dow), 28.1 g 1,4-butanediol and 514.4 g isophoronediisocyanate (Vestanat® IPDI from Evonik) in the presence of 1.4 g dibutyltin dilaurate (DBTDL) according to known procedures at 80° C. to obtain an isocyanate-functional polyurethane polymer with an NCO content of 4.95 weight-%.

The Polymer-2 was prepared by reacting 400.0 g diisononyl phthalate, 981.7 g polyoxypropylene diol with an average molecular weight of ca. 1000 g/mol (Voranol® 1010 L from Dow), 30.4 g 1,4-butanediol and 586.5 g isophoronediisocyanate (Vestanat® IPDI from Evonik) in the presence of 1.4 g dibutyltin dilaurate (DBTDL) according to known procedures at 80° C. to obtain an isocyanate-functional polyurethane polymer with an NCO content of 5.5 weight-%.

3. One-Part Moisture-Curing Liquid-Applied Membranes

For each membrane the ingredients given in Table 1 were mixed under exclusion of moisture in a sealed polypropylene beaker by means of a centrifugal mixer (SpeedMixer™ DAC 150, FlackTek Inc.) until a homogeneous fluid was obtained.

The composition of the Ingredient-Mixture-1 was 436.9 weight parts of Disflamoll® DPK (from Lanxess), 298.9 weight parts of titanium dioxide, 544.8 weight parts of aluminum trihydroxide, 213.1 weight parts of barytes, 18.5 weight parts of fumed silica, 26.9 weight parts of carbon black, 10.0 weight parts of Bis-(1,2,2,6,6-pentamethyl-4-piperidyl)-sebacate (HALS), 1.3 weight parts of dibutyltin dilaurate, and 0.8 weight parts of salicylic acid.

The membranes were stored in a tightly sealed, moisture-proof can for 24 hours at ambient temperature and then tested as follows:

The viscosity was measured with a Brookfield DV-E spindle type viscometer, spindle no 5, 30 rpm, at a temperature of 20° C. "Initial" means the viscosity measured 24 hours after mixing of the ingredients. "28 d 40° C." means the viscosity measured after an additional storage of 28 days at 40° C.

To determine the tack-free time (time until a tack-free skin has developed on the applied membrane) a small portion of the membrane was applied at a climate of 20° C./45% in a layer of 2 mm on cardboard and touched slightly with an LDPE pipette until the membrane stopped to leave a residue on the surface of the pipette.

To determine the mechanical properties, a two-layer cured film was prepared for each membrane. To prepare the film, a first layer of 800 µm thickness was applied with a draw down bar and left curing in normal climate (NC) for 24 hours; then a second layer of 400 µm thickness was applied thereon at an angle of 90° and again left curing in NC for 24 hours; the two-layer film was then placed it an oven at 60° C. for 24 hours. After an additional 24 hours in NC, bar shaped test pieces with a length of 100 mm and a width of 25 mm were punched from the film and tensile strength and elongation at break determined similar to DIN EN 53504 at a crosshead speed of 180 mm/min with a gauge length of 60 mm.

All the membranes formed flexible films without bubbles and without tack. The results are given in Table 1.

The membranes Ex-1 to Ex-6 are membranes according to the invention, the membranes Ref-1 to Ref-4 are comparative example.

TABLE 1

Composition (in weight parts) and test results of the examples Ex-1 to Ex-6 and Ref-1 to Ref-4.

| | Ref-1 | Ex-1 | Ex-2 | Ex-3 | Ex-4 | Ex-5 | Ex-6 | Ref-2 | Ref-3 | Ref-4 |
|---|---|---|---|---|---|---|---|---|---|---|
| Polymer-1 | 652.9 | 567.4 | 567.4 | 530.5 | 530.5 | 502.0 | 530.5 | 530.5 | 530.5 | 530.5 |
| IPDI Trimer[1] | 71.5 | 107.5 | 107.5 | 120.6 | 120.6 | 127.1 | 120.6 | 120.6 | 120.6 | 120.6 |
| Aldimine-A1 | — | 82.9 | — | 123.6 | — | 162.1 | — | — | — | 828.6 |
| Aldimine-A2 | — | — | 92.0 | — | 137.3 | — | — | — | — | — |
| Aldimine-A3 | — | — | — | — | — | — | 110.9 | — | — | — |
| Aldimine-R1 | — | — | — | — | — | — | — | 105.8 | — | — |
| Aldimine-R2 | — | — | — | — | — | — | — | — | 113.0 | — |
| Aldimine-B1 | 186.6 | 163.9 | 163.9 | 151.2 | 151.2 | 137.3 | 169.8 | 169.8 | 169.8 | — |
| Aldimine-B2 | 36.0 | 36.1 | 36.1 | 35.9 | 35.9 | 35.3 | 35.9 | 35.9 | 35.9 | — |
| Ingredient-Mixture-1 | 1551.2 | 1551.2 | 1551.2 | 1551.2 | 1551.2 | 1551.2 | 1551.2 | 1551.2 | 1551.2 | 1551.2 |
| Eq Ald. (I)/Eq Ald. (III)[2] | 0/100 | 10/90 | 10/90 | 15/85 | 15/85 | 20/80 | 7/93 | — | — | 100/0 |
| Solvent Content [g/L] | 15.2 | 21.4 | 21.3 | 23.6 | 23.4 | 24.7 | 23.5 | 23.6 | 23.5 | n.d. |
| Initial Visc. [mPa · s] | 10'450 | 9'010 | 8'350 | 8'430 | 7'570 | 8'480 | 9'200 | 12'210 | 10'590 | n.d. |
| Visc. 28 d 40° C. [mPa · s] | 10'770 | 9'600 | 8'990 | 8'960 | 8'480 | 8'670 | 9'410 | 12'590 | 11'570 | n.d. |
| BK Drying Time [h] | | | | | | | | | | |
| Stage 2 | 3.5 | 3.75 | 4 | 3.5 | 4 | 4 | 3.25 | 3 | 3.75 | n.d. |
| Stage 3 | 5 | 4.5 | 5 | 4.25 | 4.75 | 4.75 | 4 | 4 | 4.5 | |
| Stage 4 | 10 | 14 | 10.5 | 13.5 | 13.5 | 9 | 10.5 | 12.5 | 13 | |
| Tens. Strength [MPa] | 3.5 | 3.7 | 3.7 | 3.0 | 3.3 | 3.2 | 3.7 | 3.6 | 3.6 | 1.3 |
| Elongation at Break | 225% | 270% | 260% | 220% | 260% | 235% | 230% | 220% | 215% | 650% |

"Visc." means "Viscosity";
"Tens." means "Tensile";
"n.d.". means "not determined"

[1] Isocyanurate of IPDI, 70 weight-% in solventnaphtha 100, NCO-content 11.9 wt-% (Desmodur ® Z 4470 SN from Bayer)
[2] indicates the approximate ratio between the number of aldimino groups of aldimines of the formula (I) and the number of aldimino groups of aldimines of the formula (III)

3. One-Part Moisture-Curing Liquid-Applied Membranes with Incorporated Water

For each membrane the ingredients given in Table 2 were mixed under exclusion of moisture in a sealed polypropylene beaker by means of a centrifugal mixer (SpeedMixer™ DAC 150, FlackTek Inc.) until a homogeneous fluid was obtained.

The composition of the Ingredient-Mixture-2 was.
213.8 weight parts of diisononyl phthalate,
129.5 weight parts of titanium dioxide,
364.4 weight parts of ground calcium carbonate,
0.3 weight parts of fumed silica,
12.3 weight parts of carbon black,
13.0 weight parts of defoamer (Lucant™ HC-100 from Mitsui),
0.2 weight parts of dibutyltin dilaurate, and
0.8 weight parts of salicylic acid.

The membranes were stored in a tightly sealed, moisture-proof can for 24 hours at ambient temperature.

Short before the application 15 weight parts of water were added to 85 weight parts of each membrane and thoroughly mixed in with a dynamic mixing equipment until homogenous. The water-diluted membranes were then tested as follows:

The viscosity was measured as described for the membrane Ex-1.

The mechanical properties (tensile strength and elongation at break) were tested as described for the membrane Ex-1, but using dumbbells with a length of 75 mm, a crosspiece length of 30 mm and a crosspiece width of 4 mm.

The surface aspect was judged using the films for determining the mechanical properties. "Perfect" means a tack-free and glossy film without bubbles, cavities and other inhomogeneous parts.

These results are given in Table 2, indicated by "with added water".

Some of the membranes were also cured without the addition of water and tested like the water-diluted membranes for viscosity and mechanical properties.

The tack-free time was determined as described for the membrane Ex-1. These results are given in Table 2, indicated by "without added water".

TABLE 2

Composition (in weight parts) and test results of the examples Ex-7 to Ex-12.

| | Ex-7 | Ex-8 | Ex-9 | Ex-10 | Ex-11 | Ex-12 |
|---|---|---|---|---|---|---|
| Polymer-2 | 1207.0 | 1207.0 | 1207.0 | 1207.0 | 1207.0 | 1207.0 |
| IPDI Trimer | 130.3 | 130.3 | 130.3 | 130.3 | 130.3 | 130.3 |
| Aldimine-A4 | 111.1 | 222.2 | 222.2 | 222.2 | — | 222.2 |

TABLE 2-continued

Composition (in weight parts) and test results of the examples Ex-7 to Ex-12.

|  | Ex-7 | Ex-8 | Ex-9 | Ex-10 | Ex-11 | Ex-12 |
| --- | --- | --- | --- | --- | --- | --- |
| Aldimine-A5 | — | — | — | — | 247.0 | — |
| Aldimine-B2 | — | — | — | 335.7 | — | 142.0 |
| Aldimine-B3 | 319.3 | 298.3 | 298.3 | — | 298.3 | — |
| Oxazolidine[1] | — | — | — | — | — | 143.8 |
| Magnesium Oxide | 256.4 | 256.4 | — | 256.4 | 256.4 | 256.4 |
| Ground Calcium Carbonate | — | — | 256.4 | — | — | — |
| Ingredient-Mixture-2 | 734.3 | 734.3 | 734.3 | 734.3 | 734.3 | 734.3 |
| Eq Ald.(I)/Eq Hardener[2] | 6/94 | 12/88 | 12/88 | 12/88 | 12/88 | 25/75 |
| Solvent Content [g/L] | 17.4 | 16.7 | 16.6 | 16.3 | 16.5 | 16.8 |
| with added water: | | | | | | |
| mixing behaviour | good | good | good | good | good | good |
| Viscosity [mPa · s] | 5'500 | 6'100 | 4'200 | 5'300 | 1'500 | n.d. |
| Tensile Strength [MPa] | 7.99 | 6.89 | 7.06 | 7.01 | 4.23 | 5.41 |
| Elongation at Break [%] | 585 | 740 | 720 | 520 | 585 | 740 |
| Surface Aspect | perfect | perfect | good[3] | perfect | good[4] | perfect |
| without added water: | | | | | | |
| Viscosity [mPa · s] | 4'000 | 3'700 | 2'800 | 6'900 | 2'700 | n.d. |
| Tack-free Time [h] | 2.0 | 1.75 | 2.0 | 3.5 | 1.5 | n.d. |
| Tensile Strength [MPa] | 5.65 | 4.04 | 8.19 | 3.7 | 3.17 | n.d. |
| Elongation at Break [%] | 400 | 800 | 895 | 370 | 710 | n.d. |

"n.d." means "not determined"

[1]Bis-oxazolidine with equivalent weight 125 g (Incozol ® 4 from Incorez)

[2]indicates the approximate ratio between the number of aldimino groups of aldimines of the formula (I) and the number of isocyanate-reactive groups from oxazolidines and aldimines of formula (III)

[3]few small bubbles

[4]less gloss

The invention claimed is:

1. A one-part moisture-curing liquid-applied waterproofing membrane comprising:

at least one isocyanate-functional polyurethane polymer;

at least one aldimine of the formula (I),

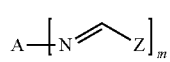

(I)

wherein m is 2 or 3,

A is a divalent or a trivalent hydrocarbyl moiety of average molecular weight in a range of 800 to 4,000 g/mol containing ether groups, and Z is a monovalent $C_3$ to $C_{30}$ hydrocarbyl moiety; and at least one hardener which is an oxazolidine or an aldimine different from formula (I), wherein a ratio between a number of aldimino groups from aldimines of the formula (I) and a number of isocyanate-reactive groups from oxazolidines and aldimines different from formula (I) is in a range of 2/98 to 40/60.

2. The membrane according to claim 1, wherein A is a divalent or a trivalent hydrocarbyl moiety of average molecular weight in a range of 1,000 to 3,000 g/mol containing oxyethylene units and/or 1,2-oxypropylene units.

3. The membrane according to claim 1, wherein the aldimine of the formula (I) is an aldimine of the formula (I a),

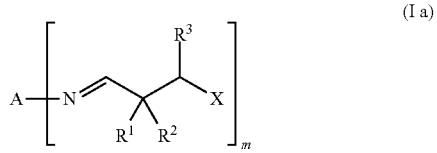

(I a)

wherein $R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring;

$R^3$ is hydrogen or a linear or branched $C_1$ to $C_{12}$ alkyl or arylalkyl or alkoxycarbonyl; and X is a monovalent moiety of the formulae

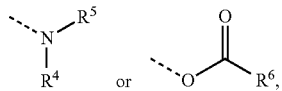

wherein $R^4$ and $R^5$ are the same or different linear or branched $C_1$ to $C_{20}$ alkyls or cycloalkyls or aralkyls optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group, and $R^6$ is hydrogen or a monovalent $C_2$ to $C_{20}$ hydrocarbyl moiety.

4. The membrane according to claim 1, wherein the aldimine of the formula (I) is selected from the group consisting of: N,N'-bis(2,2-dimethyl-3-(N-morpholino)-propylidene)-polyoxypropylenediamines with an average molecular weight in a range of 1,300 to 4,400 g/mol, N,N'-bis(2,2-dimethyl-3-lauroyloxypropylidene)-polyoxypropylenediamines with an average molecular weight in a range of 1,500 to 4,600 g/mol, N,N',N''-tris(2,2-dimethyl-3-(N-morpholino)-propylidene)-polyoxypropylenetriamines with an average molecular weight in the range of 3,000 to 4,000 g/mol, N,N',N''-tris(2,2-dimethyl-3-lauroyloxypropylidene)-polyoxypropylenetriamines with an average molecular weight in a range of 3,300 to 4,300 g/mol, N,N'-bis(2,2-dimethyl-3-(N-morpholino)-propylidene)-polyoxyethylene-polyoxypropylenediamines with an average molecular weight in a range of 2,000 to 2,600 g/mol, and N,N'-bis(2,2-dimethyl-3-lauroyloxypropylidene)-polyoxyethylene-polyoxypropylenediamines with an average molecular weight in a range of 2,200 to 2,900 g/mol.

5. The membrane according to claim 1, wherein the at least one hardener is an aldimine of the formula (III),

(III)

wherein
n is 2 or 3, and
G is a divalent or trivalent hydrocarbyl moiety of molecular weight in a range of 28 to 500 g/mol optionally containing ether or urethane groups.

6. The membrane according to claim 5, wherein the aldimine of the formula (III) is an aldimine of the formula (III a)

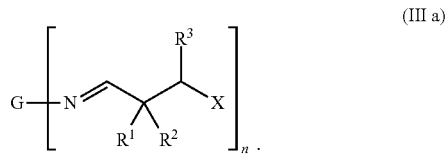

(III a)

7. The membrane according to claim 6, wherein in the at least one aldimine of the formula (III a), X is N-morpholino.
8. The membrane according to claim 5, wherein in the at least one aldimine of the formula (III), Z is phenyl.
9. The membrane according to claim 6, wherein in the at least one aldimine of the formula (III a), X is lauroyloxy.
10. The membrane according to claim 1 containing 100 g VOC per liter or less.

11. A method for waterproofing a roof, comprising:
applying the membrane according to claim 1 in a liquid state on at least a surface of the roof; and
curing the membrane.
12. Waterproofing system, consisting of:
optionally a primer and/or an undercoat;
one or more than one layer of the membrane according to claim 1, in combination with a fibre reinforcement mesh; and
optionally a top coat.
13. Method of waterproofing a roof structure, comprising:
applying the membrane according to claim 1 in liquid state onto a substrate of the roof structure in a layer thickness in a range of 0.5 to 3 mm;
contacting the membrane with a fibre reinforcement mesh within an open time of the membrane;
exposing the membrane to moisture to thereby cure the membrane partially or fully to obtain an elastic coating; and
optionally applying a second layer of the membrane according to claim 1 in a layer thickness in a range of 0.5 to 3 mm and curing it by exposure to moisture.
14. The membrane according to claim 1, wherein Z contains ether.
15. The membrane according to claim 3, wherein $R^6$ contains ether, carbonyl, or both.
16. The membrane according to claim 3, wherein the aldimine of the formula (I) is selected from the group consisting of: N,N'-bis(2,2-dimethyl-3-(N-morpholino)-propylidene)-polyoxypropylenediamines with an average molecular weight in a range of 1,300 to 4,400 g/mol, N,N'-bis(2,2-dimethyl-3-lauroyloxypropylidene)-polyoxypropylenediamines with an average molecular weight in a range of 1,500 to 4,600 g/mol, N,N',N''-tris(2,2-dimethyl-3-(N-morpholino)-propylidene)-polyoxypropylenetriamines with an average molecular weight in a range of 3,000 to 4,000 g/mol, N,N',N''-tris(2,2-dimethyl-3-lauroyloxypropylidene)-polyoxypropylenetriamines with an average molecular weight in a range of 3,300 to 4,300 g/mol, N,N'-bis(2,2-dimethyl-3-(N-morpholino)-propylidene)-polyoxyethylene-polyoxypropylenediamines with an average molecular weight in the range of 2,000 to 2,600 g/mol, and N,N'-bis(2,2-dimethyl-3-lauroyloxypropylidene)-polyoxyethylene-polyoxypropylenediamines with an average molecular weight in a range of 2,200 to 2,900 g/mol.
17. The membrane according to claim 16, wherein the at least one hardener is an aldimine of the formula (III),

(III)

wherein
n is 2 or 3, and
G is a divalent or trivalent hydrocarbyl moiety of molecular weight in a range of 28 to 500 g/mol optionally containing ether or urethane groups.
18. The membrane according to claim 1, wherein the membrane has a Brookfield viscosity in the range of 2,000 to 15,000 mPa·s.

* * * * *